J. M. AYDLOTT.
SUBSOILER.
APPLICATION FILED NOV. 17, 1913.
1,091,031.
Patented Mar. 24, 1914.
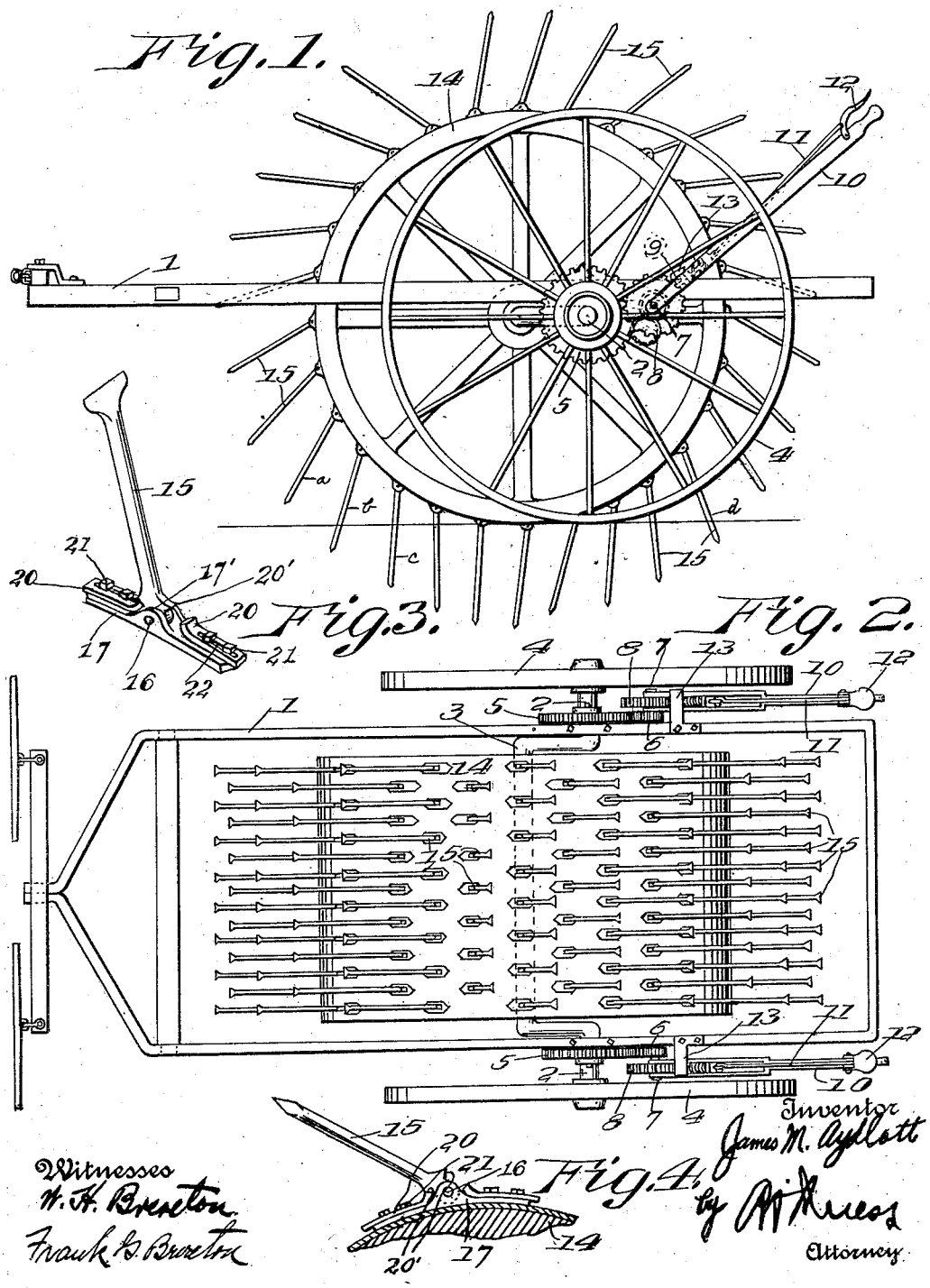

UNITED STATES PATENT OFFICE.

JAMES M. AYDLOTT, OF RAVENNA, TEXAS, ASSIGNOR OF ONE-HALF TO W. A. HANKS, OF IVANHOE, TEXAS.

SUBSOILER.

1,091,031.  Specification of Letters Patent.  Patented Mar. 24, 1914.

Application filed November 17, 1913. Serial No. 801,420.

*To all whom it may concern:*

Be it known that I, JAMES M. AYDLOTT, a citizen of the United States, residing at Ravenna, in the county of Fannin and State of Texas, have invented new and useful Improvements in Subsoilers, of which the following is a specification.

This invention relates to certain new and useful improvements in subsoilers and the primary object thereof is to provide a subsoiler which has a plurality of pivoted points which will merely loosen the under soil so that same may retain a large amount of moisture, and will not turn the under soil over, which latter injures the alluvial soil.

Further the invention aims to provide means whereby the angle at which the points leave the ground may be adjusted so as to cause the points to move the ground to a greater or less angle thereto.

In the drawings: Figure 1 is a side elevation of the invention; Fig. 2 is a top plan view; Fig. 3 is an enlarged perspective view of one of the points; and Fig. 4 is a fragmentary sectional view of the drum showing the manner in which the points are connected thereto.

In proceeding in accordance with this invention, a frame 1 is employed, which has the eccentric ends 2 of an axle 3 journaled thereon, the ends 2 having traction wheels 4 rotatably mounted thereon. Gear wheels 5 are rigidly mounted on the eccentric axle ends 2 and mesh with smaller gear wheels 6 which latter are rigidly mounted on stub-shafts 7 that are rotatably connected to the frame 1 in any suitable manner. Ratchet wheels 8 are also rigidly mounted on the stub-shafts 7 and are rotated by engagement with spring pressed detents 9 that are carried by the hand operated levers 10. The levers 10 are bifurcated at their lower ends and receive the ratchet wheels in their furcations and are pivotally mounted on the stub shafts 7. Rods 11 are connected to the detents 9 and to curved levers 12, pivoted to the levers 12 so as to enable the detents to be moved out of engagement with the teeth of the ratchet wheels 8. Stops 13 are secured to the frame 1 and engage the levers 10 to limit the upward throw of the levers.

The drum 14 is rotatably mounted on the axle 3 and has series of transverse rows of points 15 pivoted thereto by providing base plates 17 secured to the drum periphery which plates have perforated ears 17' that receive a transverse pin 16, the latter passing through the lower ends of the points 15, so that the points may have arc-like movement about the pins. In order to regulate the extent of arc-like movements of the points, adjustable stops 20 are provided, which stops are slotted at 22 and provided with screws 21 which extend through the slots 22 and into the base plates 17. The points are provided with opposite shoulders 20' which engage the extreme inner edges of the curved ends of the stops 20. The points of the rows are arranged in staggered relation to each other so as to more thoroughly work the ground.

It is particularly to be noted that the points 15 are permitted sufficient movement about the drum as a pivot to leave the ground without turning the under soil over. The drum is made very heavy so that it will, due to its weight, force the points into the ground as the points successively engage the latter and is further arranged in front of the traction wheels 4. In Fig. 1, it will be noted that point *a* has gravitated to its down position and will enter the ground at a slight angle thereto as indicated by point *b*. It will then farther penetrate the ground at a lesser angle thereto as illustrated by a point *c*, after which it will farther enter the ground until at *d* it leaves the ground at a very slight angle to the ground which angle is insufficient to turn the under soil over, which is an important feature. By means of the stops 20, the points 15 may have their movements limited so as to enable the same to leave the ground, at a less or greater angle, as desired. By movement of the lever 10, the ratchet wheel 8 may be rotated so as to move the stub-shaft 7 and therewith the gear-wheel 6, to thereby rotate the gear wheel 5 so as to raise or lower the axle 3, raising of the axle causing the points 15 to be lifted up, free of the ground when it is desired to turn the machine, or otherwise move same from place to place, without operation of the points 15.

What is claimed is:

1. In combination with a drum, a series of points pivoted to the periphery thereof so as to have arc-like movement radially of the drum, and adjustable means to enable the extent of movement of the points to be controlled.

2. In combination with a drum, a series of base plates attached thereto, spaced perforated ears on the plates, points pivoted between the ears, and a pair of stops adjustably carried by each plate and arranged on opposite sides of the points to engage the latter to thereby enable the extent of arc-like movement of the points to be controlled.

3. In combination with a drum, a series of base plates attached thereto, spaced perforated ears on the plates, points pivoted between the ears, a shoulder on each side of each point, and a pair of stops adjustably carried by each plate and having curved ends the extreme edges of which are for engagement with said shoulders.

In testimony whereof I have hereunto set my hand in presence of two subscribing witnesses.

JAMES M. AYDLOTT.

Witnesses:
J. F. HENDRIX
W. A. HANKS.

Copies of this patent may be obtained for five cents each, by addressing the "Commissioner of Patents, Washington, D. C."